United States Patent [19]
Kuhn

[11] 3,710,364
[45] Jan. 9, 1973

[54] MONITORING INSTALLATION OF THE LIGHTING SYSTEM OF MOTOR VEHICLES

[75] Inventor: Hans-Ulrich Kuhn, Hohenacker, Germany

[73] Assignee: Daimler-Benz Aktiengesellschaft, Stuttgart-Unterturkheim, Germany

[22] Filed: Jan. 13, 1971

[21] Appl. No.: 106,038

[30] Foreign Application Priority Data

Jan. 15, 1970 Germany.....................P 20 01 552.5

[52] U.S. Cl. ................340/214, 340/71, 340/75, 340/80, 340/251
[51] Int. Cl. ...........................................G08b 29/00
[58] Field of Search............340/71, 75, 80, 214, 251

[56] References Cited

UNITED STATES PATENTS

| | | |
|---|---|---|
| 1,726,994 | 9/1929 | Murray............................340/251 X |
| 3,421,143 | 1/1969 | Signorile..........................340/251 X |
| 3,250,950 | 5/1966 | Reiche ...................................315/77 |
| 3,532,928 | 10/1970 | West................................340/251 X |
| 1,945,528 | 2/1934 | Gordon..........................340/251 UX |
| 3,423,727 | 1/1969 | Adamson..........................340/52 C |
| 3,529,288 | 9/1970 | Dobrikin .............................340/60 |
| 3,593,274 | 7/1971 | Krugler............................340/80 X |

*Primary Examiner*—Kenneth N. Leimer
*Attorney*—Craig, Antonelli, Stewart & Hill

[57] ABSTRACT

An electrically operated installation in motor vehicles for monitoring the lighting system, especially the headlights, tail lights and brake lights, which includes light switches and an electromagnetic relay that controls a switch producing an acoustic or optical signal; the electromagnetic relay is provided with two oppositely wound coils for at least one of the functions of the lighting system to be monitored whereby the magnetic fields of these two coils mutually cancel in case the corresponding part of the lighting system operates completely satisfactorily.

4 Claims, 1 Drawing Figure

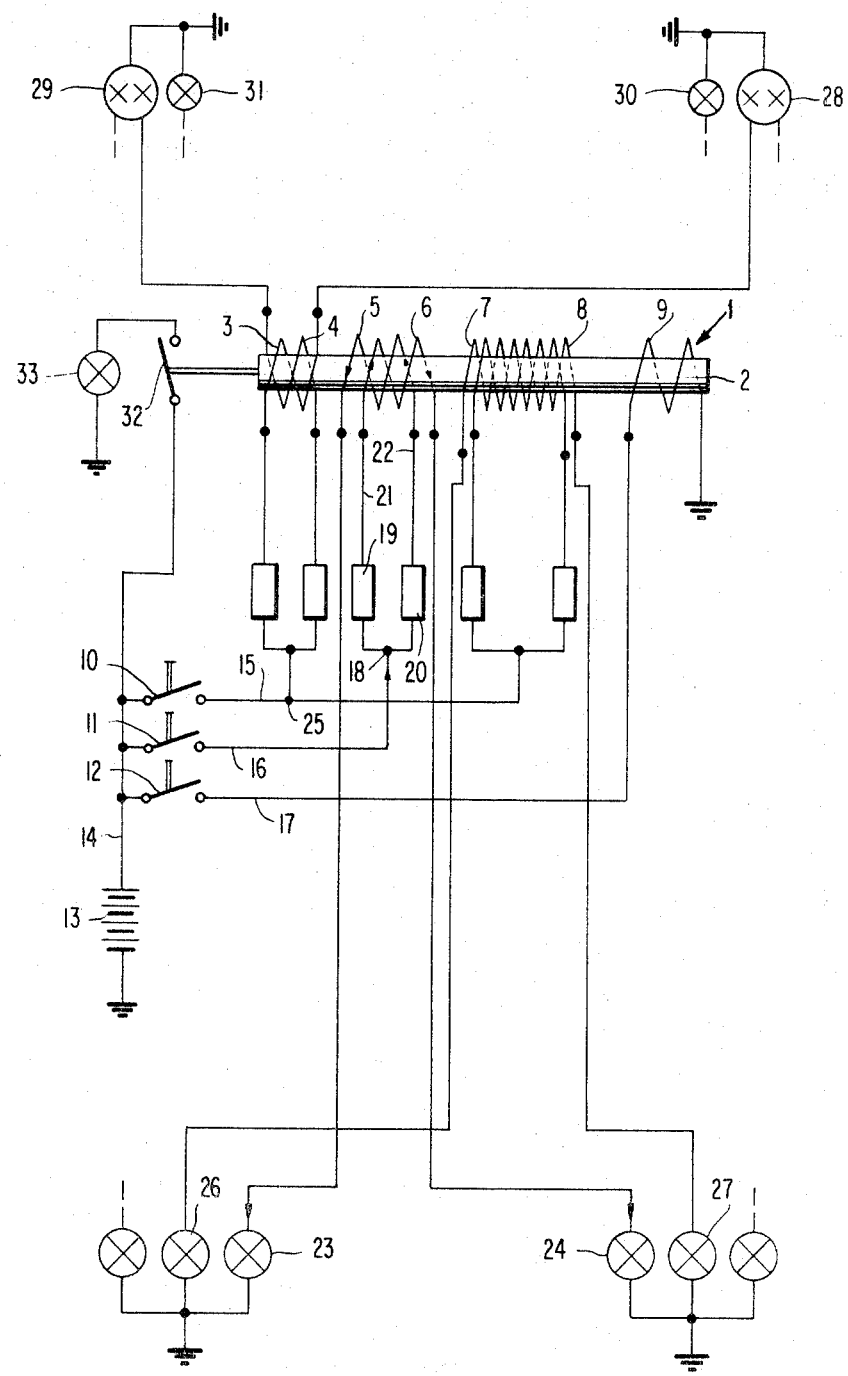

MONITORING INSTALLATION OF THE LIGHTING SYSTEM OF MOTOR VEHICLES

The present invention relates to an electrically operated installation in motor vehicles for monitoring the lighting system, especially headlights, tail lights and brake lights, which essentially consists of light switches and of an electromagnetic relay with a switch triggering or initiating an acoustic or optical signal.

The present invention is concerned with the task of providing a control installation for lighting systems which is improved compared to the heretofore known installations and which can be manufactured in a simple manner without large expenditures.

The underlying problems are solved according to the present invention in that the electromagnetic relay for at least one function of the lighting system to be monitored includes two oppositely wound coils whose magnetic fields mutually cancel each other with a completely satisfactory operation of the corresponding part of the lighting system.

According to a further feature of the present invention, the electric feed lines branching off from one or several light switches for the right and left headlights, for the right and left tail lights and for the right and left brake lights, each arranged and connected in parallel, are connected by way of the common electromagnetic relay.

On the basis of the present invention, the electromagnetic relay may additionally be provided with a single winding which is connected, on the one hand, with the starter switch and, on the other, with the switch provided for the warning lamp so that during the starting operation the operability of the warning lamp is controlled and simultaneously the function of the electromagnetic relay is monitored.

Accordingly, it is an object of the present invention to provide a monitoring system for the lighting installation in motor vehicles which avoids by simple means the aforementioned shortcomings and drawbacks encountered in the prior art.

Another object of the present invention resides in a monitoring installation for the lighting systems of motor vehicles which is greatly improved as compared to the heretofore known systems and can be manufactured readily without substantial expenditures and by simple means.

A further object of the present invention resides in a monitoring system of the type described above which not only monitors the proper operation of the lighting system, but additionally includes a self-monitoring control to test the operability of the warning device during the starting of the vehicle.

These and further objects, features and advantages of the present invention will become more obvious from the following description when taken in connection with the accompanying drawing which shows, for purposes of illustration only, one embodiment in accordance with the present invention, and wherein:

The single FIGURE is a schematic wiring diagram of the monitoring installation in accordance with the present invention for the lighting system of a motor vehicle.

Referring now to the schematic wiring diagram of the single FIGURE, reference numeral 1 generally designates therein an electromagnetic relay of any conventional construction which is provided on its iron core 2 with several windings 3 to 9 which are so constructed that two windings 3 and 4, 5 and 6, 7 and 8, with the same number of turns are provided respectively for each of three functions to be monitored and one winding 9 is provided for the monitoring of the functioning of the monitoring installation itself. The windings arranged pair-wise are wound in mutually opposite directions and insure for a current equilibrium present in the relay 1 in case of an intact lighting system.

Three switches, connected in parallel, which are designated by reference numeral 10 (light switch), reference numeral 11 (brake switch), and reference numeral 12 (starter switch), branch off from a main line 14 connected with a battery 13 and lead to the individual lines 15, 16, and 17, coordinated to the switches. The line 17 is connected directly to the winding 9 of the iron core 2. The lines 21 and 22 branching off from the line 16 at a place 18 and connected in parallel which are provided with one fuse 19 and 20 each, lead by way of the windings 5 and 6 of the iron core 2 to a respective lamp 23 and 24 arranged in the brake lights. The lines branching off from the line 15 at a place 25 and leading in an analogous manner by way of fuses and windings 7, 8 and 3, 4 of the common relay 1, are each connected with a respective lamp 26 and 27 arranged in the tail lights and with a respective lamp 28 and 29 (30 and 31) arranged in the headlights. An armature adapted to be attracted by the iron core 2 is in its normal, rest position with an intact lighting system, i.e., a switch 32 actuated by the armature is open so that an energizing circuit leading to a warning light 33 is opened.

Upon actuation of the brake light switch 11, the lamps 23 and 24 of the brake lights are energized. The currents flowing through the respective lines in the direction of the arrows flow about the iron core 2 in opposite directions. The two oppositely directed magnetic fields resulting therefrom have the same strength. The resultant field is therefore zero. A force attracting the armature is therefore not exerted by the relay and switch 32 remains open. If, for example, the lamp 23 of the brake lights fails, i.e., for example, is burned out and thus presents an open circuit or, if possibly, a short circuit occurs, then the current equilibrium and the equilibrium of the magnetic fields is disturbed. They bring about an attraction of the armature, which, in turn, actuates the switch 32 and closes the circuit leading to the warning lamp 33. The warning lamp 33 lights up.

In order to be able to control and monitor also the proper operation of the warning lamp 33, the additional winding 9 is provided on the iron core 2 which is connected with the voltage source, i.e., the battery 13, only during the starting operation, when starter switch 12 is closed, and thus attracts the armature for a short period of time and simultaneously controls thereby the operation of the electromagnetic relay 1.

While I have shown and described only one embodiment in accordance with the present invention, it is understood that the same is not limited thereto, but is susceptible of numerous changes and modifications as known to those skilled in the art, and I therefore do not wish to be limited to the details shown and described

What I claim is:

1. An electrical monitoring installation for vehicle lighting systems comprising at least one pair of vehicle lights, a warning indicator, a power source, an electromagnetic relay including first and second oppositely wound coils of equal turns, a relay switch connected between said power source and said warning indicator and a third coil inductively coupled to said first and second coils, an operating switch selectively connecting said pair of vehicle lights through said respective first and second coils to said power source, and a starter switch selectively connecting said power source to said third coil at the time of starting of said vehicle to simultaneously determine the proper operability of said warning indicator and monitor the functioning of said electromagnetic relay.

2. An installation as defined in claim 1 wherein said warning indicator is an acoustic device.

3. An installation as defined in claim 1 wherein said warning indicator is a visual indicating device.

4. An installation as defined in claim 1 wherein said first, second and third coils are wound on an iron core.

* * * * *